United States Patent [19]
Cayol et al.
[11] 3,816,247
[45] June 11, 1974

[54] NUCLEAR FUEL ASSEMBLY, ESPECIALLY FOR A FAST REACTOR

[75] Inventors: Andre Cayol, Montrouge; Jean-Claude Chenal, Aix en Provence; Georges Clottes, Manosque; Karl Schaller; Jean Skok, both of Aix en Provence; Henri Venobre, Vinon sur Verdon, all of France

[73] Assignee: Commissariat A L'Energie Atomique, Paris, France

[22] Filed: May 30, 1972

[21] Appl. No.: 257,549

[30] Foreign Application Priority Data

May 7, 1971 France ............................ 71.16633

[52] U.S. Cl. .................................... 176/78, 176/40
[51] Int. Cl. ............................................ G21c 3/32
[58] Field of Search .......................... 176/78, 76, 40

[56] References Cited

UNITED STATES PATENTS

| | | | |
|---|---|---|---|
| 3,300,388 | 1/1967 | Jerman et al. | 176/78 X |
| 3,303,099 | 2/1967 | Johnston | 176/78 |
| 3,309,280 | 3/1967 | Balog | 176/78 X |
| 3,677,893 | 7/1972 | Huebotter et al. | 176/40 |

FOREIGN PATENTS OR APPLICATIONS

| | | | |
|---|---|---|---|
| 1,951,091 | 4/1971 | Germany | 176/78 |

*Primary Examiner*—Carl D. Quarforth
*Assistant Examiner*—E. E. Lehmann
*Attorney, Agent, or Firm*—Cameron, Kerkam, Sutton, Stowell & Stowell

[57] ABSTRACT

The fuel assembly comprises at least one bundle of parallel fuel pins disposed on a uniform lattice within a pressure-resistant outer prismatic sleeve which has a polygonal cross-section and through which a coolant is circulated.

Curvature of the sleeve produced by swelling under intense irradiation is limited by means of slots which are cut across the dihedrons formed by the sleeve faces.

A thin-walled jacket which guides the coolant flow within the fuel bundle and withstands vertical handling stresses is placed between the bundle and the sleeve with provision for a clearance which permits expansion of the jacket under the action of differential pressure.

7 Claims, 4 Drawing Figures

16' 16 18 10' 10 22 26 28 30 14 28 11 12

NUCLEAR FUEL ASSEMBLY, ESPECIALLY FOR A FAST REACTOR

This invention relates to a nuclear fuel assembly of the type commonly employed in sodium-cooled fast reactors and comprising at least one bundle of canned fuel pins of substantial length disposed in parallel relation on a uniform lattice, and a sleeve in the form of a prismatic casing having a polygonal transverse cross-section which is intended to carry a circulation of cooling fluid and to contain the fuel bundle. The pins constituting a single bundle are usually supported by a grid which is rigidly fixed to the sleeve and carries rails on which the fuel-pin end-caps are engaged. The minimum fuel-pin spacing over the entire length of the bundle is determined by coarse-pitch helical spacers carried by each fuel pin. The pins of one bundle are preferably disposed on a uniform triangular lattice within a sleeve having a hexagonal transverse cross-section.

The fuel assemblies of the type hereinabove defined and designed to attain high burnup rates (at least 100,000 MWd/t in reactors at present under design) must take into account the swelling of the sleeve under the action of irradiation of the materials constituting the sleeve. In fact, all the materials which can be used in practice swell to an appreciable extent under irradiation when this latter exceeds a value which is very readily attained in these reactors, with a time-lag which is variable according to the materials employed. If no counter-measures are taken, the result produced by this swelling of the sleeve is that the assemblies placed in a zone of the reactor core in which the neutron flux exhibits a high gradient assume a curvature caused by the differential elongation of the opposite faces of the hexagonal-section sleeve. This curvature is liable to cause jamming of the fuel assemblies and gives rise to difficulties in fuel handling operations. Moreover, said curvature tends to increase or to reduce the cross-section of some of the subchannels which are formed between the fuel pins and to generate hot spots.

The solution which immediately comes to mind consists in changing periodically either the orientation or location of the fuel assemblies but proves extremely inconvenient in practice. In order to circumvent the problem, it might be considered sufficient to make use of fuel assemblies without any outer sleeve. However, this expedient results in excessive cooling of the peripheral fuel pins along the clearance provided between two adjacent assemblies and in a very hazardous curvature of these pins which are liable to cause jamming of adjacent fuel assemblies unless the pins are positionally maintained by means of grids located in very closely spaced relation in the axial direction. Moreover, in the event of melt-down of the fuel, this latter spreads more readily to a number of assemblies.

The aim of the present invention is to provide a nuclear fuel assembly which conforms to practical requirements more effectively than those proposed heretofore, especially insofar as said assembly permits a very substantial limitation of the curvature at high radiation rates, even in zones in which the radial flux gradient is of maximum value.

To this end, a nuclear fuel assembly in accordance with the invention is mainly characterized in that slots cut the dihedrons formed by the faces of the sleeve casing and that an internal jacket of smaller thickness than the sleeve is interposed between this latter and the bundle of fuel pins over at least part of the length of said sleeve.

The functions performed by the sleeve of a conventional fuel assembly are thus divided between two elements. The thin-walled internal sleeve serves to guide the flow of sodium and is capable of withstanding vertical stresses arising from fuel loading and unloading operations. The pressure difference between the interior and the exterior of the assembly tends to apply said internal jacket against the outer sleeve which is of greater thickness and is capable of withstanding pressure forces. The longitudinal expansion of the sleeve is reduced to a very appreciable extent by means of the slots which are capable of closing in a different manner on two opposite faces of the fuel assembly and thus preventing the arcuate distortion which is caused by the curvature of this latter.

The stresses which are intended to be sustained respectively by the sleeve and the jacket will usually make it necessary to provide these latter with a thickness ratio within the range of 3.5:1 and 2:1. By way of example, the jacket can be given a thickness of 1 mm whilst the sleeve can have a thickness of 3.5 mm. As a general rule, both the sleeve and the jacket will be fabricated from austenitic stainless steel in the case of sodium-cooled reactors.

The slots can be designed in a large number of different forms: they can be constituted by separate saw-cuts all inclined at the same angle to the axis and uniformly spaced so as to form in each case a cut across one dihedron of the sleeve. The slots can also consist of one or a number of continuous saw-cuts each formed along a helix within the sleeve if this latter is of sufficient thickness. According to yet another form of construction, the sleeve is cut into sections by means of slots formed at right angles to the axis and extending over the entire transverse cross-section of the sleeve.

A more complete understanding of the invention will be gained from the following description of different types of fuel assembly constituting embodiments of the invention which are given by way of example but not in any limiting sense, reference being made to the accompanying drawings, in which.

Figure 1:
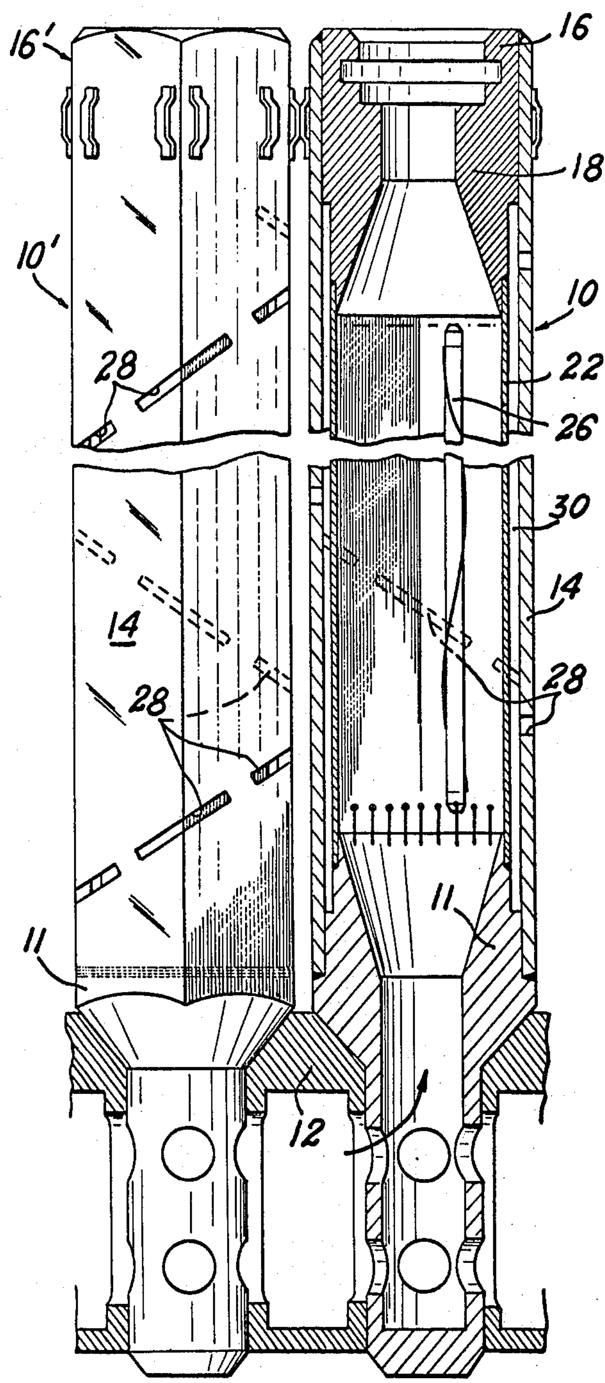
FIG. 1 shows diagrammatically two fuel assemblies of a first type which are disposed in adjacent relation within a reactor core, one of the assemblies being illustrated in cross-section along its vertical mid-plane.

FIG. 1 shows two of the fuel assemblies constituting the core of a fast reactor of the type which is cooled by an upward flow of liquid sodium. Each fuel assembly 10 and 10' is provided with a bottom end-fitting 11 which engages within a reactor-core support grid 12 forming a box structure from which the liquid sodium derived from the heat exchangers passes into the reactor core. Each fuel assembly is delimited by an outer sleeve 14 in the form of a prismatic casing having a hexagonal cross-section and attached to the end-fitting 11 so as to constitute a sodium circulation duct and by a handling head 16 which is secured to the sleeve. The interior of the head 16 is provided with packing rings 18 of neutron-absorbing material; the juxtaposition of packing elements 18 constitutes a top neutron shield of the reactor core.

Each sleeve 14 contains a thin-walled internal jacket 22 which is attached to the bottom end-fitting 11 and, in the embodiment illustrated in FIG. 1, to the neutron shield 18 which forms an extension of the head 16. A small radial clearance 30 is provided between said internal jacket and the sleeve which are usually made of stainless steel in both cases.

The fuel assembly which is illustrated in FIG. 1 comprises a single bundle of so-called "integrated" fuel pins 26, only one of which is illustrated, and in which fissile material and fertile material placed on each side of this latter are incorporated in a single unit. However, the assembly could equally well contain an additional bundle of shorter pins loaded with fertile material placed above the fuel-pin bundle 26 and forming part of a top blanket assembly.

The internal jacket 22 is of sufficiently small thickness to be applied against the sleeve 14 as a result of the difference between the pressure which prevails within the fuel assembly and the pressure existing outside this latter, at least in the lower portion of the assembly in which the pressure difference has the highest value. However, this thickness is sufficient to enable the jacket 22 alone to offer resistance to the tensile and compressive stresses which arise at the time of fuel-handling operations, in which case the internal jacket 22 alone transmits the weight of the bottom end-fitting 11 and of the fuel-pin bundle 26 to the head 16, as will become apparent hereinafter.

The sleeve 14 is provided on the contrary with a sufficient thickness to afford resistance to the pressure forces which are applied from the interior towards the exterior of the fuel assembly and which are retransmitted thereto by the jacket 22 when this latter swells under the combined action of pressure and irradiation. In order to permit swelling of the sleeve 14 without any attendant arcuate distortion when the fuel assembly is placed within a zone which has a high radial neutron-flux gradient, a series of slots 28 are accordingly formed in said sleeve. These slots all cut the dihedrons of the sleeve so that the peripheral distance left between the slots is small or of zero value. Said slots close to a greater or lesser extent as swelling of the sleeve takes place and may even close in a different manner on the opposite faces of said sleeve. In the embodiment which is illustrated in FIG. 1, these slots are aligned on a helix and are each cut across one of the dihedrons of the sleeve 14. In practice, the fraction of the length of the slots represented by the "bridge" which is permitted to remain between two adjacent slots 28 must not be larger than 50 percent. These slots can also be joined together so as to form a continuous line along the entire fuel assembly.

The width of the slots will be chosen so as to permit absorption of swelling. Thus, in the majority of cases, the cumulated axial length represented by the slots along the sleeve will represent a fraction within the range of 0.2 to 1 percent of the total length of said sleeve.

The clearance 30 which is permitted to remain between the sleeve 14 and the jacket 22 must be sufficiently small to ensure that the degree of swelling of the jacket which is necessary in order to permit application of this latter against the sleeve 14 does not give rise to an excessive increase in cross-sectional area of the peripheral sub-channels provided for the flow of coolant between the fuel pins and the jacket 22. In practice, it will be found necessary to adopt a clearance of the order of 1 millimeter. The peripheral sub-channels can in any case be below the specified size in a fuel assembly which is not in service in order that the pressure should restore them to the correct size. By way of example, it can also be mentioned that an internal jacket having a thickness of approximately 1 mm and a sleeve having a thickness of 2.5 mm will usually be adopted in the case of an integrated fuel-pin assembly having a length of several meters, of the type provided in the "Phenix" reactor.

Figure 2:
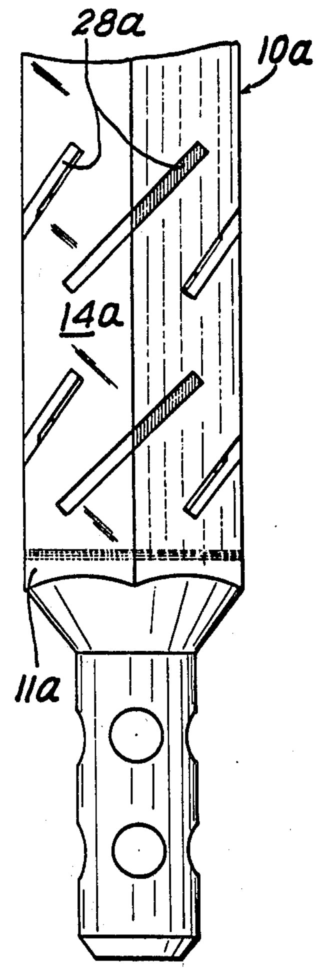
FIG. 2 is a very diagrammatic view in elevation of the lower portion of a fuel assembly of a second type.

The embodiment which is illustrated in FIG. 2 differs from the foregoing in the arrangement of the slots. For the sake of enhanced clarity, the elements illustrated in FIG. 2 which correspond to those of FIG. 1 are designated by the same reference numeral to which is assigned the index *a*.

The fuel assembly **10*a* is also provided with an outer sleeve 14*a* having a hexagonal transverse cross-section and attached to a bottom end-fitting 11*a*** which is engaged in a reactor support grid (not shown).

The slots **28*a* in this case are distributed axially in sets, the slots forming part of one set being located at the same level and each being cut across one of the dihedrons of the sleeve 14*a*. In contradistinction to FIG. 1, this arrangement makes it possible to achieve an overlap of the cut zones without thereby reducing the sleeve 14*a*** to the state of a strip.

Further alternative forms of slots would also be possible, for example by alternative inclination from one dihedron to the next or from one level to the next or by intersecting a plurality of dihedrons.

Figure 3:
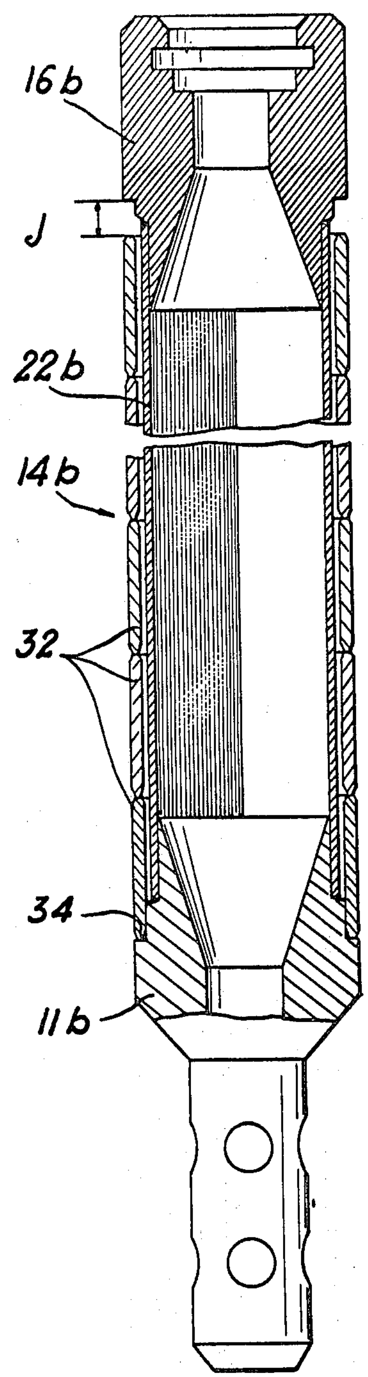
FIG. 3 shows very diagrammatically a fuel assembly of a third type, as shown in cross-section along a vertical plane.
Figure 4:
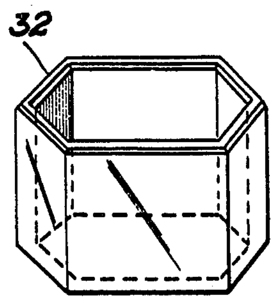
FIG. 4 shows in perspective one of the sections constituting the sleeve of the fuel assembly shown in FIG. 3.

In the embodiment which is illustrated in FIG. 3, the sleeve **14*b* is no longer formed in one piece but is constituted by juxtaposed sections 32 (as shown in FIG. 4). The bottom end-fitting 11*b* is joined to the head 16*b* by means of the internal jacket 22*b* which is welded both to the end-fitting and to the head. The cumulated length of the sections of the fuel assembly which is illustrated is such that, when said sections are applied against each other and rest on a shouldered portion 34** which is formed for this purpose on the bottom end-fitting, there remains a clearance *j* between the top edge of the stack and the opposite flat face of the head, although this clearance is not necessary in all cases.

In this embodiment, the internal jacket also serves to guide the flow of coolant and to transmit longitudinal stresses at the time of handling of the fuel assembly. The sections 32 constitute reinforcement bands which limit radial swelling of the jacket **22*b*.** The clearance between the internal jacket and the section in the inoperative state and the thicknesses can be of the same order as in the previous case. The assembly which is thus obtained has a high degree of flexibility, thereby preventing arcuate distortions.

The invention is clearly not limited solely to the embodiments which have been described by way of example with reference to the drawings and it must be understood that the scope of this patent extends to alternative forms of either all or part of the arrangements described which remain within the definition of equivalent means.

What we claim is:

1. A nuclear fuel assembly consisting of at least one bundle of canned-fuel pins of substantial length, said pins being disposed in parallel relation on a uniform lattice, a sleeve in the form of a prismatic casing having a polygonal transverse cross-section which contains said bundle and carries a circulation of cooling fluid, a bottom end fitting secured to said casing, a handling head secured to said casing, slots in the dihedrons formed by the faces of the sleeve casing and an internal jacket of smaller thickness than the sleeve between said sleeve and the bundle of fuel pins and secured to said bottom end fitting and to said handling head, the ratio of the thickness of the sleeve to the thickness of the internal jacket being between 3.5:1 and 2:1.

2. A fuel assembly according to claim 1, wherein the slots are aligned on a helix and each cut at least one dihedron of the sleeve.

3. A fuel assembly according to claim 2, wherein the slots form a continuous line and the sleeve is a continuous strip.

4. A fuel assembly according to claim 1, wherein the slots are distributed in a plurality of sets spaced along the axis of said assembly, the slots forming part of one set being parallel at the same level and each cutting at least one of the dihedrons of the sleeve.

5. A fuel assembly according to claim 4, wherein the slots forming part of one set have an inclination to the axis opposite to the inclination of the slots forming part of an adjacent set.

6. A fuel assembly according to claim 1, wherein the sleeve is cut into sections by the slots located at right angles to the axis and extending over the entire transverse cross-section of said sleeve.

7. A fuel assembly according to claim 1 wherein the sleeve and the internal jacket are of austenitic stainless steel.

* * * * *